United States Patent
Shimoyama et al.

(10) Patent No.: US 12,188,555 B2
(45) Date of Patent: Jan. 7, 2025

(54) SHIFT CONTROL METHOD AND SHIFT CONTROL SYSTEM

(71) Applicant: NISSAN MOTOR CO., LTD., Yokohama (JP)

(72) Inventors: Hiroki Shimoyama, Kanagawa (JP); Munetoshi Ueno, Kanagawa (JP); Takefumi Suzuki, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 448 days.

(21) Appl. No.: 17/612,320

(22) PCT Filed: May 20, 2019

(86) PCT No.: PCT/JP2019/019931
§ 371 (c)(1),
(2) Date: Nov. 18, 2021

(87) PCT Pub. No.: WO2020/234973
PCT Pub. Date: Nov. 26, 2020

(65) Prior Publication Data
US 2022/0243805 A1     Aug. 4, 2022

(51) Int. Cl.
*F16H 61/04*     (2006.01)
*B60W 20/30*     (2016.01)
(Continued)

(52) U.S. Cl.
CPC .............. *F16H 61/04* (2013.01); *B60W 20/30* (2013.01); *F16H 59/18* (2013.01); *F16H 59/42* (2013.01);
(Continued)

(58) Field of Classification Search
CPC .......... F16H 61/04; F16H 59/18; F16H 59/42; F16H 59/66; F16H 63/502; F16H 2061/0474; B60W 20/30
See application file for complete search history.

(56) References Cited

U.S. PATENT DOCUMENTS 3,792,631 A * 2/1974 Mori .................... F16H 61/0403
477/154
5,569,115 A * 10/1996 Desautels .............. B60W 10/11
477/110
(Continued)

FOREIGN PATENT DOCUMENTS

JP    2005-282741 A    10/2005
JP    2008-032185 A    2/2008
(Continued)

*Primary Examiner* — Naeem Taslim Alam
(74) *Attorney, Agent, or Firm* — Foley & Lardner LLP

(57) ABSTRACT

The present invention provides a shift control method include: setting a basic target synchronization rotation speed that is a basic target value of the input shaft rotation speed during the shift; determining whether or not an accelerating intention is present when the shift is a downshift with a driving force requirement to the vehicle; when the accelerating intention is present, setting a first target input shaft rotation speed as the target input shaft rotation speed, the first target input shaft rotation speed being obtained by increasingly correcting the basic target synchronization rotation speed; and when the accelerating intention is not present, setting a second target input shaft rotation speed as the target input shaft rotation speed, the second target input shaft rotation speed being obtained by maintaining or decreasingly correcting the basic target synchronization rotation speed.

7 Claims, 6 Drawing Sheets

(51) Int. Cl.
   *F16H 59/18*   (2006.01)
   *F16H 59/42*   (2006.01)
   *F16H 59/66*   (2006.01)
   *F16H 63/50*   (2006.01)

(52) U.S. Cl.
   CPC ........... *F16H 59/66* (2013.01); *F16H 63/502* (2013.01); *F16H 2061/0474* (2013.01)

(56) References Cited

U.S. PATENT DOCUMENTS

| | | | |
|---|---|---|---|
| 6,193,628 B1* | 2/2001 | Hrovat | F16H 61/0437 477/3 |
| 10,030,598 B2* | 7/2018 | Gennard | F02D 41/10 |
| 10,457,286 B1* | 10/2019 | Mayhew | B60W 10/06 |
| 2008/0026910 A1 | 1/2008 | Honma et al. | |
| 2011/0054751 A1* | 3/2011 | Yamada | F16H 61/143 701/60 |
| 2011/0071742 A1* | 3/2011 | Inuta | F16H 61/143 701/68 |
| 2013/0087018 A1* | 4/2013 | Maurer | F16H 37/042 74/745 |
| 2014/0081559 A1* | 3/2014 | Kar | F02D 41/0225 701/110 |
| 2014/0214292 A1* | 7/2014 | Suzuki | F16H 61/66259 701/58 |
| 2014/0277976 A1* | 9/2014 | Mitsuyasu | F16H 63/46 701/67 |
| 2015/0224977 A1* | 8/2015 | Sata | F16H 61/04 701/54 |
| 2016/0185353 A1* | 6/2016 | Honma | B60W 10/06 477/109 |
| 2017/0058808 A1* | 3/2017 | Gennard | G01C 9/00 |
| 2019/0271393 A1* | 9/2019 | Hattori | F16H 61/66259 |
| 2020/0096096 A1* | 3/2020 | Inoue | F16H 59/46 |

FOREIGN PATENT DOCUMENTS

| | | |
|---|---|---|
| JP | 2008-75718 A | 4/2008 |
| JP | 2009-92176 A | 4/2009 |
| JP | 2011-133069 A | 7/2011 |
| WO | WO 2018/124220 A1 | 7/2018 |

* cited by examiner

SHIFT CONTROL METHOD AND SHIFT CONTROL SYSTEM

TECHNICAL FIELD

The present invention relates to a shift control method and a shift control system.

BACKGROUND ART

In a conventional shift control system as disclosed in JP2008-32185A, a decision is first made whether or not a downshift accompanied by a stepping-in of the accelerator pedal. Hereinafter, the downshift is also described as "accelerator stepping-in downshift". If the shift operation is judged to be the accelerator stepping-in downshift, a target input shaft rotating speed is set by increasingly correcting a basic target synchronizing speed, whereby acceleration of the vehicle during the shift is assumed. The basic target synchronizing speed is a basic target value of the input shaft rotation speed during the shift.

SUMMARY OF INVENTION

However, depending on the running conditions during which a shift is taking place, the vehicle may experience a slow down even under the driving force due to accelerator pedal operation. In such a case, increasing correction of the target input shaft rotating speed may allow the input shaft rotating speed to exceed the final target value, resulting in a shift shock at the moment when the clutch engages.

Considering such situations, an objective of this invention is to provide a shift control method and a shift control system that can suppress the occurrence of a shift shock at the accelerator stepping-in downshift.

In an aspect of this invention, a shift control method implemented in a vehicle equipped with an automatic transmission for controlling an input shaft rotation speed of the automatic transmission to a target input shaft rotation speed during a shift is provided. The shift control method includes setting a basic target synchronization rotation speed that is a basic target value of the input shaft rotation speed during the shift, and determining whether or not an accelerating intention is present when the shift is a downshift with a driving force requirement to the vehicle.

The shift control method also includes setting a first target input shaft rotation speed as the target input shaft rotation speed when the accelerating intention is present and setting a second target input shaft rotation speed as the target input shaft rotation speed when the accelerating intention is not present. The first target input shaft rotation speed is obtained by increasingly correcting the basic target synchronization rotation speed. The second target input shaft rotation speed is obtained by maintaining or decreasingly correcting the basic target synchronization rotation speed.

DESCRIPTION OF EMBODIMENTS

Hereinafter, embodiments of this invention are described referring to figures.

Figure 1:
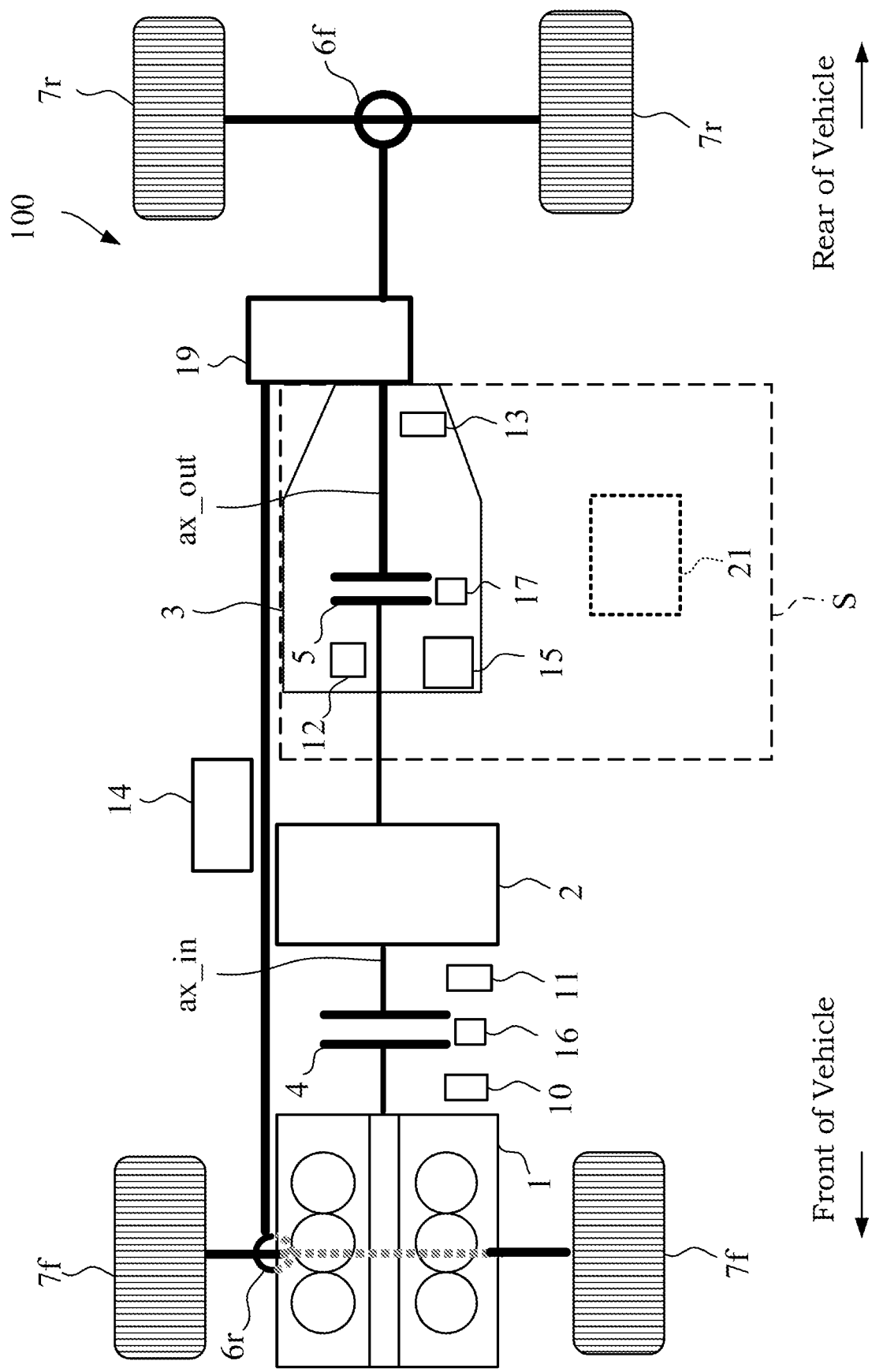
FIG. 1 shows a vehicular configuration to which a shift control method of the invention is applied.

FIG. 1 shows a power train configuration of a vehicle 100, to which a shift control method of the embodiment is applied.

As shown in the figure, the vehicle 100 of the embodiment contains an internal combustion engine 1, a motor generator 2, an automatic transmission 3, and a transfer unit 19. In the embodiment, a shift control system S is configured by the automatic transmission 3 and an integrated controller 21 (to be further described later) acting as a shift controller.

Inside the vehicle 100 of the embodiment, the internal combustion engine 1, the motor generator 2 and the automatic transmission 3 are arranged in order from a front side toward running direction (or vehicle front) to a rear side. The internal combustion engine 1, the motor generator 2 and the automatic transmission 3 are mutually connected by way of an input shaft ax_in. In other words, the vehicle 100 of the embodiment is constructed as a hybrid vehicle having two sources of driving force, i.e. the internal combustion engine 1 and the motor generator 2.

The input shaft ax_in is provided with a clutch (a first clutch 4) in a position between the internal combustion engine 1 and the motor generator 2. Therefore, transmission of force between the internal combustion engine 1 and the motor generator 2 can be on-off controlled by engaging or releasing the first clutch 4.

The first clutch 4 is configured by a wet multiple disc clutch allowing a torque transmission capacity Tc1 to vary through changing the volume and pressure of working fluid for the clutch continuous or step-wise by means of a first solenoid valve 16.

The automatic transmission 3 is a device to automatically change speed between the input shaft ax_in and an output shaft ax_out. Specifically, the automatic transmission 3 has the following elements: the second clutch 5, an input rotation sensor 12, an output rotation sensor 13, and the mechanical oil pump 15.

The second clutch 5 can be configured by a wet multiple disc clutch allowing a torque transmission capacity Tc2 to vary through changing the volume and pressure of working fluid for the clutch continuous or stepwise by means of a second solenoid valve 17.

Magnitude of a solenoid current provided to the second solenoid valve 17 is controlled by the command from the integrated controller 21 (i.e. the shift control unit) such that the torque transmission capacity Tc2 coincides with a desired target torque transmission capacity tTc2.

The input rotation sensor 12 detects the rotation speed of the input shaft ax_in (hereinafter simply referred to as "input shaft rotation speed N_in"). The input rotation sensor 12 transmits the detected input shaft rotation speed N_in (hereinafter also referred to as the "actual input shaft rotation speed Nd_in") to the integrated controller 21.

The output rotation sensor 13 detects the rotation speed of the input rotation sensor 12 (hereinafter also referred to as "output shaft rotation speed Nd_out"). The output rotation sensor 13 transmits the detected output shaft rotation speed N_out (hereinafter also referred to as "actual output shaft rotation speed Nd_out") to the integrated controller 21.

The mechanical oil pump 15 is driven by the internal combustion engine 1, and provides clutch working fluid to the second clutch 5. The electric sub-oil pump 14, driven by the motor generator 2, may be used as an auxiliary pump to complement the supply of the working fluid to the second clutch 5.

The transfer unit 19 is arranged on the output side of the automatic transmission 3. The transfer unit 19 is a driving force distribution mechanism that divides and transmits a rotation of the output shaft ax_out to a front wheel 7f and a rear wheel 7r via a front final drive 6f and a rear final drive 6r respectively.

The vehicle 100 with the configuration described above provides the following two main interchangeable driving modes: an electric power running mode ("EV mode") and a hybrid running mode ("HE mode").

If the EV mode is selected, the first clutch 4 is released and the second clutch 5 is engaged. With this setting, the output only from the motor generator 2 is transmitted to the output shaft ax_out via the input shaft ax_in and the automatic transmission 3.

If the HEV mode is selected, both the first clutch 4 and the second clutch 5 are engaged. With this setting, the output from both the internal combustion engine 1 and the motor generator 2 is transmitted to the output shaft ax_out via the input shaft ax_in and the automatic transmission 3.

In the HEV mode, if the energy produced by the internal combustion engine 1 becomes redundant, a redundant energy is converted to an electric power by driving the motor generator 2 as a power generator and stored into a battery 9 as described below. The electric power stored in the battery can be used to drive the motor generator 2 when running under a high load, and thus fuel efficiency of the internal combustion engine 1 is improved.

The following paragraphs describe a control system mounted on the vehicle 100.

Figure 2:
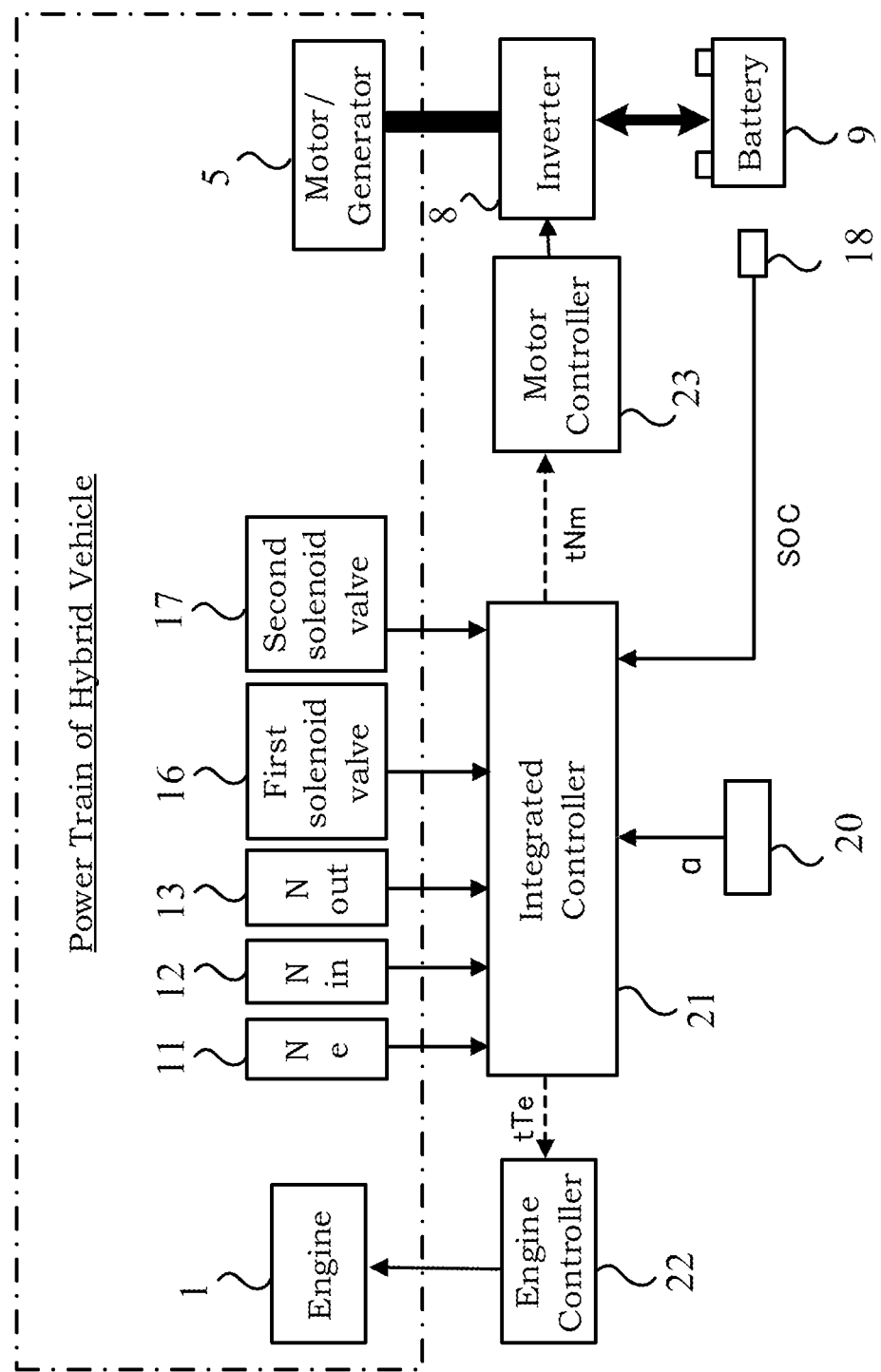
FIG. 2 is a block diagram illustrating a vehicular control system.

FIG. 2 is a block diagram illustrating the control system mounted on the vehicle 100. As shown in the figure, the control system mounted on the vehicle 100 has the integrated controller 21, the engine controller 22, the motor controller 23, and the inverter 8.

The integrated controller 21 is a device to integrally control an operating point of a power train. The integrated controller 21 controls the operating point of the power train based on the following parameters: an engine rotation speed Ne detected by the engine rotation sensor 12; the actual input shaft rotation speed Nd_in detected by the input rotation sensor 12; the actual output shaft rotation speed Nd_out detected by the output rotation sensor 13; an accelerator opening α (demand load) detected by an accelerator opening sensor 20, and charging state (SOC) of the battery 9 detected by the SOC sensor 18. The integrated controller 21 also obtains as additional input information that includes a detected value from a vehicle speed sensor (not shown in the figure) or a vehicle speed V calculated by a predefined calculation.

The integrated controller 21 performs a rotation synchronizing shift as the method of shift control in the embodiment. More particularly the integrated controller 21 uses the motor generator 2 to control the input shaft rotation speed N_in to approach a final target value to be realized after the shift has completed. Hereinafter the final target value is also referred to as "final target synchronization rotation speed tN_in*").

In particular, the integrated controller 21 of the present embodiment sets the target motor rotation speed tNm, so that the actual input shaft rotation speed Nd_in becomes close to a target synchronization rotation speed tN_in during the shift. Specifically, the integrated controller 21 calculates the target motor rotation speed tNm by removing a rotation speed component due to the rotation of the internal combustion engine 1 from the input shaft rotation speed Nd_in. The rotation speed due to the internal combustion engine 1 is defined as a net rotation speed actually transmitted to the motor generator 2. The net rotation speed is obtained by correcting the engine rotation speed Ne by a reduction ratio of the power transmission path from the internal combustion engine 1 to the motor generator 2.

The engine controller 22 is a device to control the internal combustion engine 1 to operate at a desired operating point (a target engine torque tTe) commanded by the integrated controller 21. More specifically, the engine controller 22 controls an air flow actuator and a fuel flow actuator (both not shown in the figure), each of which is provided so as to be served as an auxiliary device.

The motor controller 23 controls the inverter 8 to adjust the power supply from the battery 9 to the motor generator 2 to satisfy the operating point of the power train (a target motor torque tTm or the target motor rotation speed tNm, etc.) commanded by the integrated controller 21. In particular, the motor controller 23 of the present embodiment controls the inverter 8 to have the motor rotation speed Nm matched with the target motor rotation speed tNm, which has been calculated by the integrated controller 21.

Each of the controllers as described above—the integrated controller 21, engine controller 22, and motor controller 23—can be embodied with a computer (especially, a microcomputer), which consists of a central processing unit (CPU), a read only memory (ROM), a random access memory (RAM), and an input/output (I/O) interface.

In the following paragraphs, detailed descriptions are given to the shift method implemented by the integrated controller 21 in the present embodiment.

Figure 3:
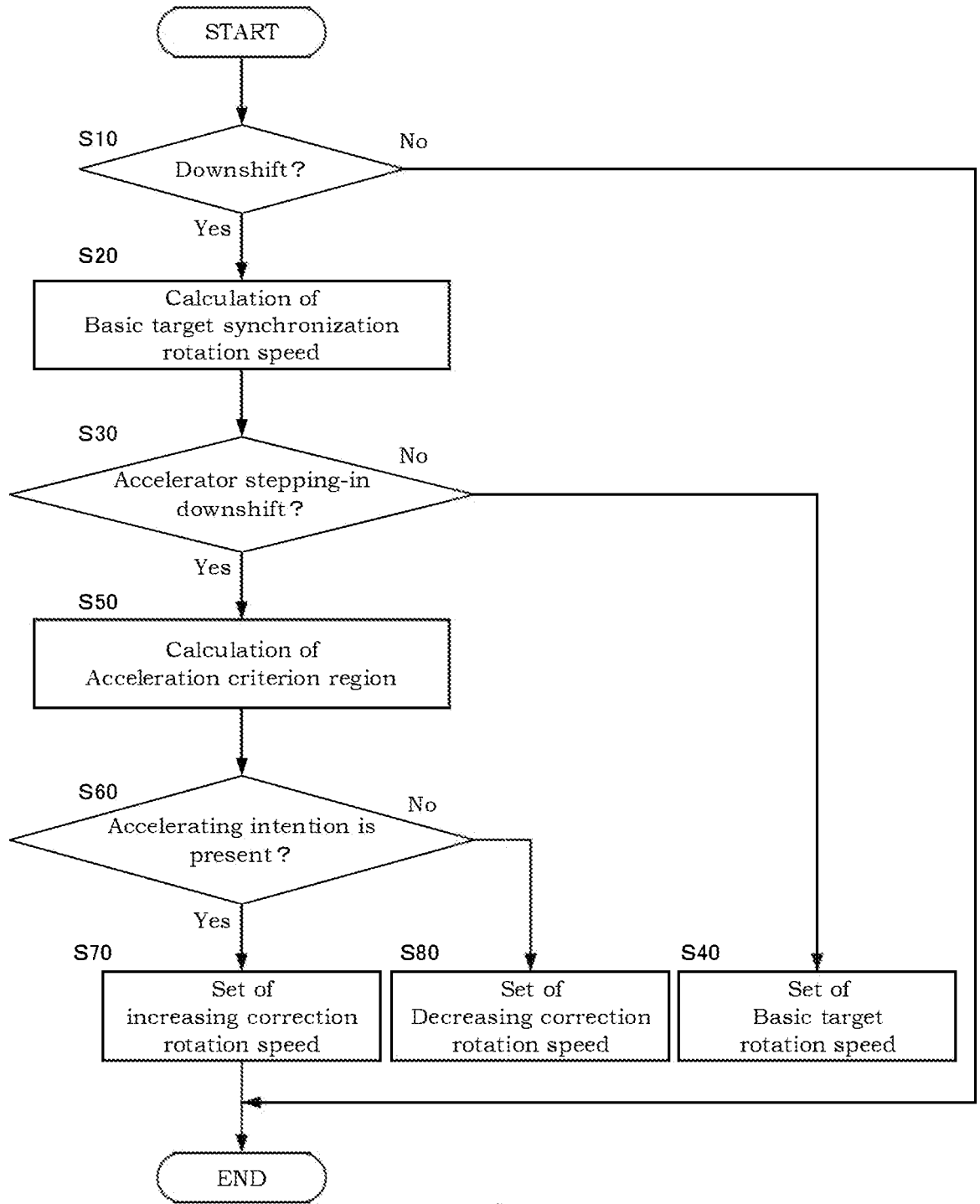
FIG. 3 is a flow chart for illustrating the shift control method implemented in the present embodiment.

FIG. 3 is a flow chart illustrating t for illustrating the shift control method implemented in the present embodiment. The integrated controller 21 in the present embodiment performs the processing shown in FIG. 3 repeatedly at each of given control periods.

Figure 4:
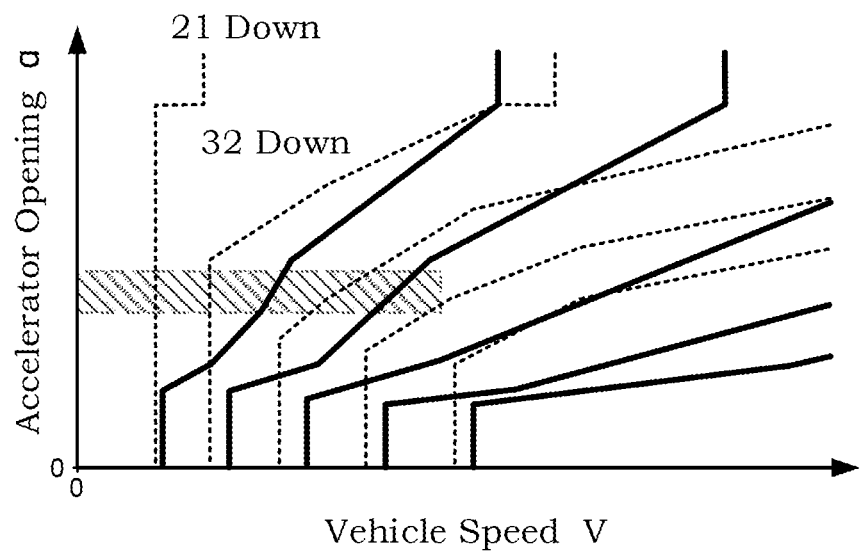
FIG. 4 is an exemplary chart representing a method to set an accelerating intention criterion region.

In step S10, the integrated controller 21 determines whether a timing has come for the vehicle 100 to execute a downshift based on the accelerator opening α and vehicle speed V, referring to a predetermined shift map (FIG. 4).

Specifically, the integrated controller 21 decides to perform the downshift if at least one of the two parameters—the accelerator opening α or the vehicle speed V—has changed to a sufficient degree during the given control period to move the operating point of the vehicle 100 to cross the downshift line (dotted line in FIG. 4).

If the decision in step S10 is negative, the integrated controller 21 exits from this routine. On the other hand, if the decision is affirmative, the integrated controller 21 proceeds to and after step S20

In step 20, the integrated controller 21 calculates a basic target synchronizing rotation speed tbN_in.

More specifically, the integrated controller 21 has the actual output shaft rotation speed Nd_out signal filtered to remove noise and high frequency vibration components. Then, the integrated controller 21 multiplies the filtered signal with the target change gear ratio γ to obtain the basic target synchronizing rotation speed tbN_in.

A target change gear ratio γ used for the shift control in the embodiment is defined as the ratio of the actual output shaft rotation speed Nd_out to the actual input shaft rotation speed Nd_in.

The basic target synchronizing rotation speed tbN_in is calculated using the equation (1) below.

[Formula 1]

$$tbN\_in = (\text{the filtered } Nd\_out) \times \gamma \qquad (1)$$

In step 30, the integrated controller judges whether or not the shift is the accelerator stepping-in downshift.

Here, the accelerator stepping-in downshift means a downshift performed when the accelerator opening α is greater than zero (for instance, when an accelerator operation by the driver of the vehicle 100 is detected).

The integrated controller 21 substantially determines in step 30, while assuming the positive result in step 10, whether or not the shift is the accelerator stepping-in downshift by evaluating if the accelerator opening α is greater than zero.

The integrated controller 21, if having determined that the shift is not the accelerator stepping-in downshift, proceeds to step S40 and set the basic target synchronizing rotation speed tbN_in calculated by Equation (1) to a target input shaft rotation speed tN_in.

The integrated controller 21, if having determined that the shift is the accelerator stepping-in downshift, proceeds to step S50.

In step S50, the integrated controller 21 calculates to define an accelerating intention criterion region R(α, V), which is used to determine whether or not an accelerating intention is present.

Here, the term "accelerating intention" means whether or not the driver actually intends to accelerate the vehicle 100 when he/she steps in the acceleration pedal (requires greater driving force) during a downshift. For example, while the vehicle 100 is running on a road with greater running resistance, the driver may want to provide a certain driving force just to avoid excessive slowdown of the vehicle speed. In such case, detection of an accelerator operation does not necessarily indicate actual acceleration of the vehicle 100 (increase of the vehicle speed V). For example, while the vehicle 100 is running uphill, the vehicle speed V may decrease due to the reversing force from the inclined road even if the driver is stepping-in the pedal to a certain amount, and the downshift may initiate in this situation.

Therefore, the accelerating intention criterion region R (α, V) of the embodiment is set as a suitable reference range of an operating point O (α, V) of the vehicle 100 in view of determining whether the accelerator operation during the downshift is actually accompanied by an acceleration of the vehicle 100.

FIG. 4 illustrates an example method to configure the accelerating intention criterion region R (α, V)

As shown in the figure, the accelerating intention criterion region R (α, V) of the embodiment is an extent of area defined by the acceleration opening α and the vehicle speed V in the given range. For example, the accelerating intention criterion region R(α, V) can be an area defined by two parameter ranges: the acceleration opening α ranging approx. from 30 to 40%, and the vehicle speed V from several km/h to approx. 60 km/h. In this figure, the accelerating intention criterion region R(α, V) is defined assuming a downshift form second to first speed, or from third to second speed. Without being limited to this, the extent of the accelerating intention criterion region R(α, V) can be expanded to a higher vehicle speed side, assuming higher shifting steps for example from fourth to third speed.

In other words, the extent of the accelerating intention criterion region R (α, V) is defined as the range where, as long as the operating point O (α, V) is located within this range, the vehicle 100 is able to obtain sufficient drive force to continue to run against the travel resistance without suffering excessive deceleration.

Therefore, if the accelerator opening α of the vehicle 100 is located in the area below the accelerating intention criterion region R (α, V), the intention of the detected accelerator operation can well be estimated to compensate a running resistance and avoid excessive decrease in vehicle speed V, rather than to actually accelerate the vehicle 100.

On the other hand, if the accelerator opening α of the vehicle 100 is located in the area above the accelerating intention criterion region R (α, V), it is considered to demand larger driving force than just compensate running resistance, allowing the judgment that there is an intention to actually accelerate the vehicle 100.

In particular, the accelerating intention criterion region R (α, V) shown in FIG. 4 is defined assuming the running resistance caused by practically encountered range of a road inclination.

The accelerating intention criterion region R (α, V), if defined based on known information (practically encountered road inclination, etc.), can be stored in advance in the memory implemented in the integrated controller 21.

In another approach, the integrated controller 21 may gather the running resistance of the road in real time while the vehicle 100 is running, and sequentially calculate the accelerating intention criterion region R (α, V).

Back to FIG. 3, the integrated controller 21, after completing the processing in step 50, moves to step 60.

In step S60, the integrated controller 21 uses the accelerating intention criterion region R (α, V) set up in S50 to determine whether or not the accelerating intention to the vehicle 100 is present.

More particularly, the integrated controller 21 determines the presence of the accelerating intention if the operating point O (α, V) of the vehicle 100 falls in the area above the accelerating intention criterion region R (α, V). On the other hand, if the operating point O (α, V) falls in the area within, or below the accelerating intention criterion region R (α, V), the integrated controller 21 determines the absence of the accelerating intention.

To be exact, however, falling of the operating point O (α, V) within the accelerating intention criterion region R (α, V) does not exclude the possibility of the presence of the accelerating intention. Even in this case, an absence of the accelerating intention is assumed and no increasing correction to the basic target synchronizing rotation speed tbN_in, which is described below is applied.

The processing in the integrated controller 21 goes to step S70 if presence of the accelerating intention is identified, or go to step S80 otherwise.

In step S70, the integrated controller 21 performs a rotation speed increase correction process. More particularly, the integrated controller 21 calculates a first target input shaft rotation speed tN_in1 by adding a positive correction value $\Delta N_+$ to the basic target synchronizing rotation speed tbN_in determined in step S20.

The first target input shaft rotation speed tN_in1 is calculated using the Equation (2) below.

[Formula 2]

$$tN\_in1 = tbN\_in + \Delta N_+ \qquad (2)$$

The integrated controller 21 sets the first target input shaft rotation speed tN_in1 to the target input shaft rotation speed tN_in, and outputs it to the motor controller 23.

In step S80, contrary to step 70, the integrated controller 21 performs rotation speed decrease correction process. More particularly, the integrated 21 calculates a second target input shaft rotation speed tN_in2 by adding zero or negative correction value ΔN_ to the basic target synchronizing rotation speed tbN_in determined in step S20.

The second target input shaft rotation speed tN_in2 is calculated using the Equation (3) below.

[Formula 3]

$$tN\_in2 = tbN\_in + \Delta N\_ \quad (3)$$

If, in step S60, the operating point O (α, V) is found to fall within the accelerating intention criterion region R (α, V), the correction value ΔN_ is preferably set to zero.

Then, the integrated controller 21 sets the second target input shaft rotation speed tN_in2 to the target input shaft rotation speed tN_in, and outputs it to the motor controller 23.

According to the shift control method shown in FIG. 3, if presence of the accelerating intention is detected during the accelerator stepping-in downshift, the first target input shaft rotation speed tN_in1, which is the basic target synchronization rotation speed tbN_in corrected for positive offset, is set to the target input shaft rotation speed tN_in.

On the other hand, if absence of the accelerating intention is detected during the accelerator stepping-in downshift, the second target input shaft rotation speed tN_in2, which is the basic target synchronization rotation speed tbN_in corrected for negative offset, is set to the target input shaft rotation speed tN_in.

Next, a behavior of the input shaft rotation speed N_in during the accelerator stepping-in downshift are explained according to the shift control method used in the embodiment.

Figure 5:
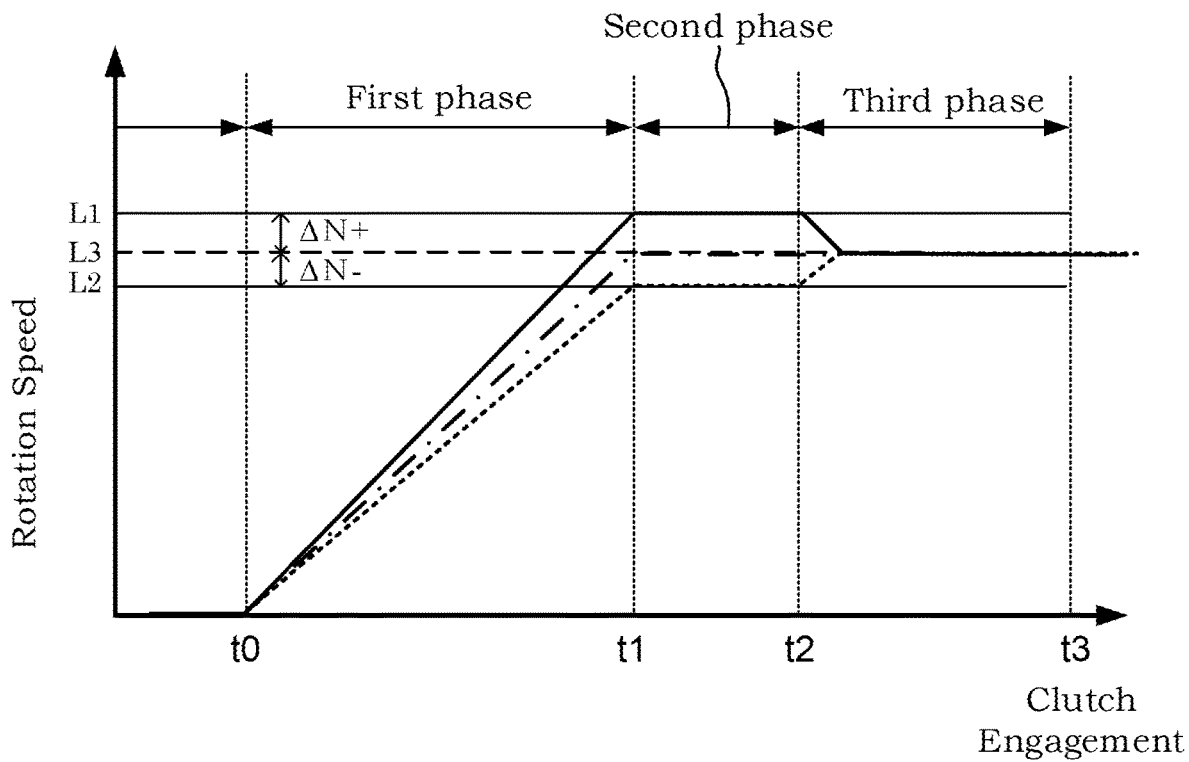
FIG. 5 is a time chart showing temporal changes of the target input shaft rotation speed while the driver is performing downshift with stepping-in of accelerator pedal.

FIG. 5 is a time chart showing temporal changes of the target input shaft rotation speed tN_in under the shift control method of the embodiment during the accelerator stepping-in downshift. Note that, to facilitate understanding the shift control method used in the embodiment, vehicle speed during the accelerator stepping-in downshift is assumed to be constant.

In FIG. 5, the solid line indicates temporal changes of the target input shaft rotation speed tN_in in cases when the presence of the accelerating intention is identified. The dotted line in this figure indicates temporal changes of the input shaft rotation speed N_in when the following two conditions are met: the operating point O (α, V) falls in the area below the accelerating intention criterion region R (α, V), and the accelerating intention is determined to be absent. The dashed line in this figure indicates temporal changes of the input shaft rotation speed N_in when the following two conditions are met: the operating point O (α, V) falls within the accelerating intention criterion region R (α, V), and the accelerating intention is determined to be absent.

Namely, the solid line in FIG. 5 indicates temporal changes of the first target input shaft rotation speed tN_in1. By the same token, the dotted line in FIG. 5 indicates temporal changes of the second target input shaft rotation speed tN_in2, wherein the correction value ΔN_ is set to be below zero.

The solid lines L1 and L2 indicate final values of the first target input shaft rotation speed tN_in1 and the second target input shaft rotation speed tN_in2 respectively. The dashed line L3 indicates a final value of the target input shaft rotation speed tN_in*.

As seen from FIG. 5, a shift phase in the embodiment are divided into three (first, second and third phase) after the elapse of a preliminary phase before the shift starts.

During the preliminary phase—from the start of the shift control ("Yes" in step S10 of FIG. 3) to the time point t0—preliminary control operations (such as releasing of the second clutch 5) are performed.

At the time point t0, the phase of shift is transferred from the preliminary phase to the first phase and the control of the input shaft rotation speed N_in starts. At the timing of transition to the first phase, the target input shaft rotation speed tN_in is set according to the processes of made in step S60 and step S70.

Namely, in the case if the accelerating intention is detected, the first target input shaft rotation speed tN_in1, which is the basic target synchronizing rotation speed tbN_in corrected for offset in positive direction, is set as the target input shaft rotation speed tN_in which should be valid during the first and second phase.

Therefore, the input shaft rotation speed N_in increases approaching the first target input shaft rotation speed tN_in1.

On the other hand, in the case if the operating point O (α, V) falls below the accelerating intention criterion region R (α, V) and the accelerating intention is not detected, the second target input shaft rotation speed tN_in2, which is the basic target synchronizing rotation speed tbN_in corrected for offset in negative direction, is set as the target input shaft rotation speed tN_in which should be valid during the first and second phase.

Therefore, the input shaft rotation speed N_in increases approaching the second target input shaft rotation speed tN_in2.

Furthermore, in the case if the operating point O (α, V) falls within the accelerating intention criterion region R (α, V) and the accelerating intention is not detected, the second target input shaft rotation speed tN_in2 almost without offset correction (ΔN_ is set about 0) (i.e., the basic target synchronizing rotation speed tbN_in) is set as the target input shaft rotation speed tN_in which should be valid in the first and second phase.

Figure 6:
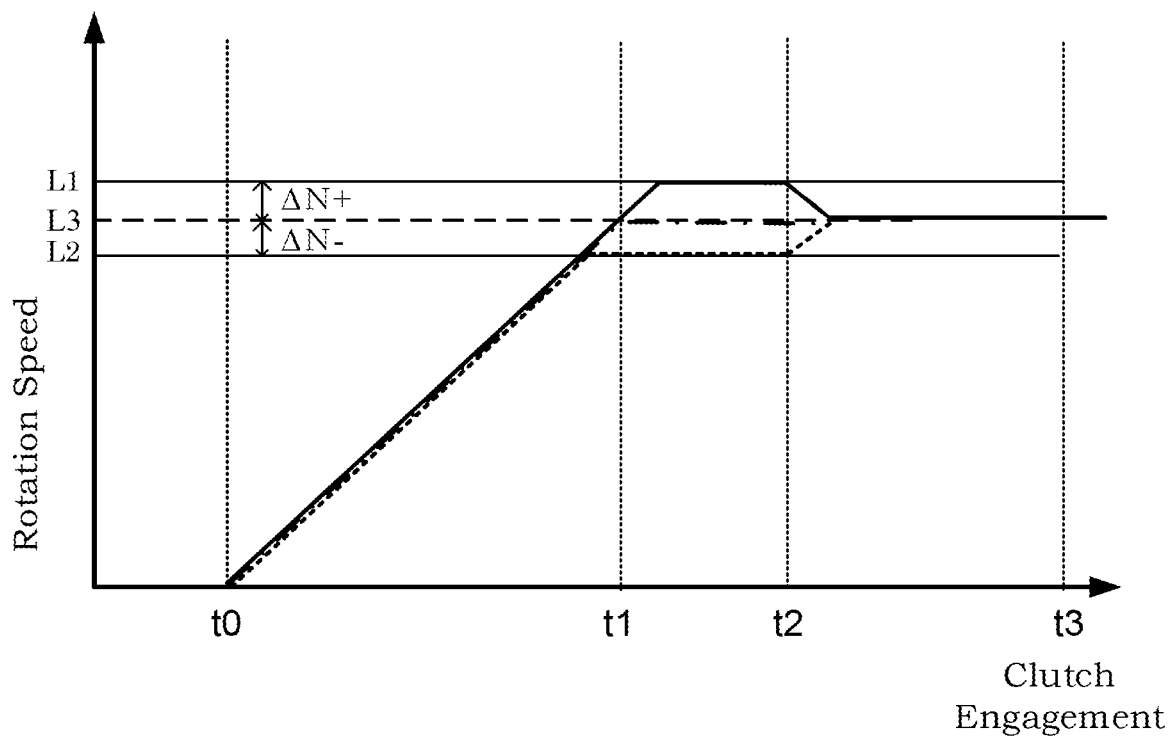
FIG. 6 is a time chart showing temporal changes of a target input shaft rotation speed during the accelerator stepping-in downshift.

Therefore, the input shaft rotation speed N_in increases approaching the basic target synchronizing rotation speed tbN_in. In the embodiment, in particular, the change rate in the first phase, as defined by the target input shaft rotation speed tN_in, varies depending on presence/absence of the accelerating intention. However, as shown in FIG. 6, the same change rate may be set both to the input shaft rotation speed N_in and the basic target synchronization rotation speed tbN_in.

At the time point t1, a transition of the shift phase takes place, from the first phase to the second phase. In the second phase, the target input shaft rotation speed tN_in is maintained for a given period of time to achieve stable convergence of the input shaft rotation speed N_in to the target input shaft rotation speed tN_in set at the start of the first phase.

Then, at the time point t2, yet another speed phase transition takes place, from the second phase to the third phase.

In the third phase, the target input shaft rotation speed tN_in is set to the final target synchronization rotation speed tN_in*. With these settings, the input shaft rotation speed N_in converges to the final target synchronizing rotation speed N_in* starting from either of the values set in the first and second phase (i.e., the first target input shaft rotation speed tN_in1 or the second target input shaft rotation speed tN_in2). When the input shaft rotation speed N_in becomes stable at the final target synchronization speed tN_in*, the shift control process completes with the engagement of the second clutch 5.

Technical significance of the above-described embodiment is explained in reference to the background art.

In the subsequent paragraphs, background art preceding the embodiment is explained. To simplify the descriptions, the symbols used to identify parameters in the embodiment are also used for the corresponding ones that appear in the background art.

The accelerator stepping-in downshift, which is accompanied by a driving force requirement, creates a greater rate of increase in the actual output shaft rotation speed Nd_out. By setting the basic target synchronizing rotation speed tbN_out, which is obtained by filtering the actual output shaft rotation speed Nd_out, to the target input shaft rotation speed tN_in (see Eq. 1), the target input shaft rotation speed tN_in follows the increase of the actual output shaft rotation speed Nd_out with a delay.

According to the background art, when the accelerator stepping-in downshift takes place, a value obtained by correcting the basic target synchronizing rotation speed tbN_with positive offset (i.e., the first target input shaft rotation speed tN_in1) is set to the target input shaft rotation speed tN_in in view of compensating the delay in the basic target synchronizing rotation speed tbN_in.

Depending on the running environment, as already described, a downshift following the detection of the driving force requirement may take place after the vehicle speed V has already slowed down. In other words, in the running environment where certain amount of the running resistance is inevitably generated depending on the road conditions, and even if the driving force is provided to the vehicle 100 compensating the running resistance to avoid excessive slowdown of the vehicle speed V, the downshift may take place after the vehicle speed V has already been lowered.

In the shift control method used in the background art, the first target input shaft rotation speed tN_in1 (i.e., the basic target synchronizing rotation speed tbN_in corrected for positive offset) is set to the target input shaft rotation speed tN_in even if the accelerator stepping-in downshift, which is not accompanied by actual increase of the vehicle speed V, takes place.

As a result, the actual input shaft rotation speed Nd_in during the shift may become excessively large, possibly resulting in engagement of the second clutch 5 while the actual input shaft rotation speed Nd_in is overshooting the final target synchronizing rotation speed tN_in*. This clutch engagement often causes a gear shift shock.

In the embodiment, to provide a solution against such a problem in the background art, a decision is made at the time of the accelerator stepping-in downshift regarding presence/absence of the accelerating intention, thus actual acceleration of the vehicle 100 can be expected or not. Based on this evaluation, one of the two following values is set to the target input shaft rotation speed tN_in depending on the possibility of the actual acceleration: the first target input shaft rotation speed tN_in1 (i.e., basic target synchronizing rotation speed tbN_in corrected for positive offset) or the second target input shaft rotation speed tN_in1 (i.e., basic target synchronizing rotation speed tbN_in, or after correction for negative offset).

In this way, the input shaft rotation speed N_in can be more suitably adjusted during the accelerator stepping-in downshift, resulting in suppression of a shift shock.

More particularly, the overshoot during the accelerator stepping-in downshift, which is caused by the positive offset-correction of the basic target synchronizing rotation speed tbN_in, and the ensuing shift shock can be avoided.

In the following paragraphs, actual effects the configuration of the embodiment exert are further described.

In the embodiment, a shift control method implemented in a vehicle 100 equipped with an automatic transmission 3 for controlling an input shaft rotation speed N_in of the automatic transmission 3 to a target shaft rotation speed tN_in during a shift.

The shift control method includes setting a basic target synchronization rotation speed tbN_in that is a basic target value of the input shaft rotation speed N_in during the shift (step S20 in FIG. 3), and setting a corrected target input shaft rotation speed tN_inC as the target shaft rotation speed tN_in when the shift is a downshift with a driving force requirement to the vehicle 100 (step S30, S50 and S60 of FIG. 3).

When the accelerating intention is present ("Yes" in step 60) a first target input shaft rotation speed tN_in1 is set as the target input shaft rotation speed tN_in (step S70). The first target input shaft rotation speed tN_in1 is obtained by increasingly correcting the basic target synchronization rotation speed tbN_in. Further, when the accelerating intention is not present, setting a second target input shaft rotation speed tN_in2 as the target input shaft rotation speed tN_in. the second target input shaft rotation speed tN_in2 is obtained by maintaining or decreasingly correcting the basic target synchronization rotation speed tbN_in (step S80).

This approach enables to evaluate, at the time of the accelerator stepping-in downshift, whether the downshift is accompanied by actual increase of the vehicle speed V, and to correct the basic target synchronizing rotation speed tbN_in either in positive or negative direction according to the evaluation result. As a result, during the accelerator stepping-in downshift, the input shaft rotation speed N_in can be more suitably adjusted depending on the level of increase in vehicle speed V, which may causing a delay in the basic target synchronization rotation speed tbN_in.

More particularly, in the shift control method of the embodiment, the basic target synchronization rotation speed tbN_in is calculated by applying a filter processing to an actual output shaft rotation speed Nd_out of an automatic transmission 3 during the shift and then by multiplying a target shift ratio γ after the shift (see Eq. 1).

During the accelerator stepping-in downshift that produces increase of the vehicle speed V, the basic target synchronization rotation speed tbN_in calculated in this way follows the actual output shaft rotation speed Nd_out with some delay owing to the filtering. In such situation, the shift control method of the embodiment sets the first target input shaft rotation speed tN_in1, which is the basic target synchronizing rotation speed tbN_in corrected for positive offset, to the target input shaft rotation speed tN_in. This setting has an effect of reducing the tracking delay between the basic target synchronization rotation speed tbN_in and the actual output shaft rotation speed Nd_out, resulting in suppression of shift shock caused by the tracking delay.

In case the accelerator stepping-in downshift that does not produce increase in the vehicle speed V, the tracking delay of the basic target synchronization rotation speed tbN_in following the increase in the actual output shaft rotation speed Nd_out is very small. In such situation, the shift control method of the embodiment sets the second target input shaft rotation speed tN_in2, which is the basic target synchronizing rotation speed tbN_in corrected for negative or zero offset, to the target input shaft rotation speed tN_in. Therefore, the target input shaft rotation speed tN_in during the shift process is adjusted to be equal to, or less than the basic target synchronizing rotation speed tbN_in. As a result, the shift shock caused by the overshooting of the actual input shaft rotation speed Nd_in over the final target synchronizing rotation speed tN_in* can be suppressed.

According to the shift control method of the embodiment, it is decided that the accelerating intention is present when the accelerator opening α (the accelerator pedal operation amount) is more than an acceleration criterion region R (α, V), and that the accelerating intention is not present when the accelerator opening α is equal to or below the acceleration criterion region R (α, V).

In this way, the decision regarding the intention of the driver of the vehicle (if he/she has an intention to accelerate or not) can be made easily using the accelerator pedal operation amount as a concrete parameter.

According to the shift control method of the embodiment, the acceleration criterion region R (α, V) is defined based on a running resistance of the vehicle 100.

This approach enables to define the acceleration criterion region R (α, V) paying due attention to the road conditions and associated running resistance which may require to provide a certain amount of the driving force forward to prevent unintentional slowdown of the vehicle speed V. As a result, the situation where the driver operates the accelerator pedal without any intention to accelerate can be more accurately grasped. In other words, undesired increasing correction of the basic target synchronizing rotation speed tbN_in can be more reliably suppressed, for example, for such situation where no actual acceleration of the vehicle 100 occurs during a downshift with stepping-in of accelerator pedal.

In the embodiment, the running resistance includes a road inclination, which is provided within a practically encountered range (see FIG. 4).

An example of road conditions that requires the provision of certain amount of forward driving force to the vehicle 100 is an uphill driving. Even in such cases, the acceleration criterion region R (α, V) can be defined assuming a practically encountered range of road inclination and the driving force (amount of accelerator pedal operation) required to cancel the reverse force. Thus, the acceleration criterion region R (α, V) can be defined for use as a useful judgment criterion to identify the presence/absence of the accelerating intention.

The input shaft rotation speed N_in is controlled by the motor generator 2 (an electric motor mounted on the vehicle 100 as the source of driving force).

The use of the motor generator 2 enables the rotation synchronizing shifts to be electrically controlled.

Further according to the embodiment, a shift control system S for the vehicle 100 having the automatic transmission 3 and the integrated controller 21 controlling the input shaft rotation speed tN_in of the automatic transmission 3 to the target input shaft rotation speed tN_in during the shift.

The integrated controller 21 as a shift control device includes a basic target synchronization rotation speed set unit (step S20 in FIG. 3) configured to set a basic target synchronization rotation speed tbN_in that is a basic target value of the input shaft rotation speed N_in during the shift and an accelerating intention determination unit (step S30, S50 and S60 of FIG. 3) configured to determine whether or not an accelerating intention is present when the shift is a downshift with a driving force requirement to the vehicle 100.

The integrated controller 21 also includes a rotation speed increasing correction unit (step S70) configured to, when the accelerating intention is present ("Yes" in step 60), set a first target input shaft rotation speed tN_in1 as the target input shaft rotation speed tN_in, the first target input shaft rotation speed tN_in1 being obtained by increasingly correcting the basic target synchronization rotation speed tbN_in. The integrated controller 21 further includes a rotation speed increasing correction unit (step S80) configured to, when the accelerating intention is not present ("No" in step 60), set a second target input shaft rotation speed tN_in2 as the target input shaft rotation speed tN_in, the second target input shaft rotation speed tN_in2 being obtained by maintaining or decreasingly correcting the basic target The configuration described above provides a system suitable to perform the shift control.

In this specification, a typical embodiment of this invention are described, which should be considered to represent an examples of the applications of this invention and by no means limit the range of technical scope of this invention to the specific configurations of the embodiment.

In the embodiment, the range (upper and lower limit) of the accelerator opening α as shown in the graphic representation of the intention of the acceleration criterion region R (α, V) (FIG. 4) is set almost constant irrespective of the vehicle speed V. However, the upper and lower limit of the acceleration opening α in the acceleration criterion region R (α, V) may be changed according to the magnitude of the vehicle speed V.

In the embodiment described herein, the motor generator 2 is used to adjust the input shaft rotation speed N_in during the process of shift. However, the actuator that can be used to adjust the input shaft rotation speed N_in is not limited to the motor generator 2. For example, the input shaft rotation speed N_in can be adjusted by engaging the first clutch 4 and controlling the output of the internal combustion engine 1 adequately.

In the embodiment described herein, the driving force required to the vehicle 100 is estimated using the accelerator opening α (i.e., the amount of accelerator pedal operation done by the driver of the vehicle 100). However, the method used to estimating the demand of driving force to the vehicle 100 is not limited to this. For example, in case if the so-called automatic driving or auxiliary driving support function are installed on the vehicle 100, the parameters produced by these mounted devices, or the directions from the driver, can be used as equivalent variables to estimate that the requirement for the driving force to the vehicle 100 is absent. estimate the driving force demanded to the vehicle 100.

The invention claimed is:

1. A shift control method implemented in a vehicle equipped with an automatic transmission for controlling an input shaft rotation speed of the automatic transmission to a target input shaft rotation speed during a shift, comprising:
   setting a basic target synchronization rotation speed that is a basic target value of the input shaft rotation speed during the shift;
   determining whether or not the shift is a downshift with a driving force requirement to the vehicle where an accelerator opening of the vehicle is greater than zero;
   in response to determining that the shift is the downshift with the driving force requirement, determining whether or not an accelerating intention is present by comparing the accelerator opening with an accelerating intention criterion region;

in response to determining that the accelerator opening is more than the accelerating intention criterion region, setting a first target input shaft rotation speed as the target input shaft rotation speed, the first target input shaft rotation speed being obtained by increasing the basic target synchronization rotation speed; and in response to determining that the accelerator opening is greater than zero and equal to or below the accelerating intention criterion region, setting a second target input shaft rotation speed as the target input shaft rotation speed, the second target input shaft rotation speed being obtained by maintaining or decreasing the basic target synchronization rotation speed.

2. The shift control method according to claim 1 comprising:

calculating the basic target synchronization rotation speed by applying a filter processing to an actual output shaft rotation speed of the automatic transmission during the shift and then by multiplying a target shift ratio after the shift.

3. The shift control method according to claim 2 comprising:

defining the accelerating intention criterion region based on a running resistance of the vehicle.

4. The shift control method according to claim 3, wherein the running resistance comprises a road inclination, which is provided within a practically encountered range.

5. The shift control method according to claim 1 comprising:

controlling the input shaft rotation speed by an electric motor mounted on the vehicle as a source of the driving force.

6. A shift control system for a vehicle having an automatic transmission and a shift control device controlling an input shaft rotation speed of the automatic transmission to a target input shaft rotation speed during a shift, wherein the shift control device comprises:

a basic target synchronization rotation speed set unit configured to set a basic target synchronization rotation speed that is a basic target value of the input shaft rotation speed during the shift;

an accelerator stepping-in down shift determination unit configured to determine whether or not the shift is a downshift with a driving force requirement to the vehicle where an accelerator opening of the vehicle is greater than zero;

an accelerating intention determination unit configured to, in response to determining that the shift is the downshift with the driving force requirement, determine whether or not an accelerating intention is present by comparing the accelerator opening with an accelerating intention criterion region;

a rotation speed increasing correction unit configured to, in response to determining that the accelerator opening is more than the accelerating intention criterion region, set a first target input shaft rotation speed as the target input shaft rotation speed, the first target input shaft rotation speed being obtained by increasing the basic target synchronization rotation speed; and a rotation speed maintaining or decreasing correction unit configured to, in response to determining that the accelerator opening is greater than zero and equal to or below the accelerating intention criterion region, set a second target input shaft rotation speed as the target input shaft rotation speed, the second target input shaft rotation speed being obtained by maintaining or decreasing the basic target synchronization rotation speed.

7. A shift control system for a vehicle having an automatic transmission and a shift control device controlling an input shaft rotation speed of the automatic transmission to a target input shaft rotation speed during a shift, the shift control device being programmed to:

set a basic target synchronization rotation speed that is a basic target value of the input shaft rotation speed during the shift;

determine whether or not the shift is a downshift with a driving force requirement to the vehicle where an accelerator opening of the vehicle is greater than zero;

in response to determining that the shift is the downshift with the driving force requirement, determine whether or not an accelerating intention is present by comparing the accelerator opening with an accelerating intention criterion region;

in response to determining that the accelerator opening is more than the accelerating intention criterion region, set a first target input shaft rotation speed as the target input shaft rotation speed, the first target input shaft rotation speed being obtained by increasing the basic target synchronization rotation speed; and in response to determining that the accelerator opening is greater than zero and equal to or below the accelerating intention criterion region, set a second target input shaft rotation speed as the target input shaft rotation speed, the second target input shaft rotation speed being obtained by maintaining or decreasing the basic target synchronization rotation speed.

* * * * *